United States Patent
Muto et al.

(10) Patent No.: US 10,421,451 B2
(45) Date of Patent: Sep. 24, 2019

(54) DRIVING ASSISTANCE APPARATUS

(71) Applicant: DENSO CORPORATION, Kariya, Aichi-pref. (JP)

(72) Inventors: Shigehiro Muto, Kariya (JP); Kiyoshi Tsurumi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 230 days.

(21) Appl. No.: 15/323,446

(22) PCT Filed: Jun. 26, 2015

(86) PCT No.: PCT/JP2015/003238
§ 371 (c)(1),
(2) Date: Jan. 3, 2017

(87) PCT Pub. No.: WO2016/009600
PCT Pub. Date: Jan. 21, 2016

(65) Prior Publication Data
US 2017/0137025 A1    May 18, 2017

(30) Foreign Application Priority Data
Jul. 14, 2014    (JP) .................. 2014-144177

(51) Int. Cl.
*G01C 22/00* (2006.01)
*G05D 1/00* (2006.01)
(Continued)

(52) U.S. Cl.
CPC ............ *B60W 30/09* (2013.01); *B60W 10/04* (2013.01); *B60W 10/184* (2013.01);
(Continued)

(58) Field of Classification Search
CPC ........ G08G 1/166; G08G 1/163; G08G 1/161; G08G 1/162; G08G 1/164; G08G 1/167;
(Continued)

(56) References Cited

U.S. PATENT DOCUMENTS

2007/0282532 A1    12/2007    Yamamoto et al.
2012/0010762 A1    1/2012    Asano

FOREIGN PATENT DOCUMENTS

| JP | H10026535 A | 1/1998 |
| JP | 2004271814 A | 9/2004 |

(Continued)

*Primary Examiner* — Abby Y Lin
*Assistant Examiner* — Kenny A. Taveras
(74) *Attorney, Agent, or Firm* — Harness, Dickey & Pierce, P.L.C.

(57) ABSTRACT

A driving assistance apparatus for performing driving assistance for a subject vehicle by using a position of the subject vehicle and road map data is provided. The driving assistance apparatus includes a different vehicle information acquisition portion for acquiring travel information about a different vehicle traveling near the subject vehicle, a road extraction section for extracting a junctional road connected, in a vehicle entry allowed manner, to a specific intersection ahead in a travel direction on a traveling road traveled by the subject vehicle, a determination section for determining a possibility of collision between the different vehicle and the subject vehicle when it is detected the different vehicle is traveling in the direction to enter the specific intersection; and a support section for performing a process to avoid the collision when the determination section determines that the possibility of the collision exists.

8 Claims, 5 Drawing Sheets

(51) Int. Cl.
  *B60W 30/09* (2012.01)
  *G01C 21/26* (2006.01)
  *B60W 10/04* (2006.01)
  *B60W 10/184* (2012.01)
  *B60W 10/20* (2006.01)
  *B60W 30/095* (2012.01)
  *B60W 50/12* (2012.01)
  *G05D 1/02* (2006.01)
  *G08G 1/16* (2006.01)
  *G01C 21/30* (2006.01)
  *G08G 1/01* (2006.01)
  *G08G 1/0967* (2006.01)

(52) U.S. Cl.
  CPC ........ *B60W 10/20* (2013.01); *B60W 30/0956* (2013.01); *B60W 50/12* (2013.01); *G01C 21/26* (2013.01); *G01C 21/30* (2013.01); *G05D 1/0219* (2013.01); *G08G 1/0112* (2013.01); *G08G 1/0133* (2013.01); *G08G 1/0145* (2013.01); *G08G 1/09675* (2013.01); *G08G 1/096725* (2013.01); *G08G 1/096791* (2013.01); *G08G 1/163* (2013.01); *G08G 1/164* (2013.01); *G08G 1/166* (2013.01); *G08G 1/167* (2013.01); *B60W 2550/10* (2013.01); *B60W 2550/30* (2013.01); *B60W 2600/00* (2013.01); *B60W 2750/40* (2013.01)

(58) Field of Classification Search
  CPC .. G08G 1/0112; G08G 1/0133; G08G 1/0145; G08G 1/09626; G08G 1/0967; G08G 1/096725; G08G 1/09675; G08G 1/096783; G08G 1/096791; G08G 1/165; B60W 30/18154; B60W 30/0956; B60W 2550/30; B60W 2550/402; B60W 30/095; B60W 30/16; B60W 2900/00; B60W 30/09; B60W 2550/408; B60W 2720/10; B60W 50/14; B60W 10/184; B60W 10/20; B60W 2520/10; B60W 2550/20; B60W 2720/106; B60W 30/143; B60W 10/04; B60W 10/06; B60W 10/18; B60W 2050/0071; B60W 2050/0073; B60W 2050/0078; B60W 2050/046; B60W 2050/048; B60W 2420/40; B60W 2420/403; B60W 2420/52; B60W 2550/10; B60W 2550/12; B60W 2550/141; B60W 2550/306; B60W 2600/00; B60W 2750/40; B60W 30/02; B60W 30/04; B60W 30/08; B60W 30/14; B60W 30/18172; B60W 40/04; B60W 40/06; B60W 40/072; B60W 40/076; B60W 40/10; B60W 50/00; B60W 50/12; G01C 21/26; G01C 21/30; G01C 21/3697; G05D 1/0219; G05D 1/0221; G05D 1/0225; G05D 1/0246; G05D 1/0257; G05D 1/027; G05D 1/0274; G05D 1/0278; G05D 2201/0213
  See application file for complete search history.

(56) References Cited

FOREIGN PATENT DOCUMENTS

| | | |
|---|---|---|
| JP | 2007241729 A | 9/2007 |
| JP | 2008065480 A | 3/2008 |
| JP | 2008097413 A | 4/2008 |
| JP | 2008123443 A | 5/2008 |
| JP | 2010224762 A | 10/2010 |
| JP | 2011191894 A | 9/2011 |
| JP | 2013125337 A | 6/2013 |
| JP | 2013131144 A | 7/2013 |
| JP | 2014002647 A | 1/2014 |

DRIVING ASSISTANCE APPARATUS

CROSS REFERENCE TO RELATED APPLICATIONS

This application is a U.S. National Phase Application under 35 U.S.C. 371 of International Application No. PCT/JP2015/003238 filed on Jun. 26, 2015 and published in Japanese as WO 2016/009600 A1 on Jan. 21, 2016. This application is based on and claims the benefit of priority from Japanese Patent Application No. 2014-144177 filed on Jul. 14, 2014, The entire disclosures of all of the above applications are incorporated herein by reference.

TECHNICAL FIELD

The present disclosure relates to a driving assistance apparatus to support driving of a subject vehicle by using a subject vehicle position detected by a subject vehicle position detection means and road map data stored in a road map data storage means.

BACKGROUND ART

A driving assistance apparatus mounted on a vehicle (such as an automobile) is proposed as a system that determines and notifies prediction of collision between a subject vehicle and a different vehicle at an intersection based on positions, travel directions, speeds, and map information about the subject vehicle and the different vehicle (such as a two-wheel vehicle or a four-wheel vehicle) (e.g., see patent literature 1).

A related technology is described below. The related technology does not necessarily constitute prior-art.

Figure 5:
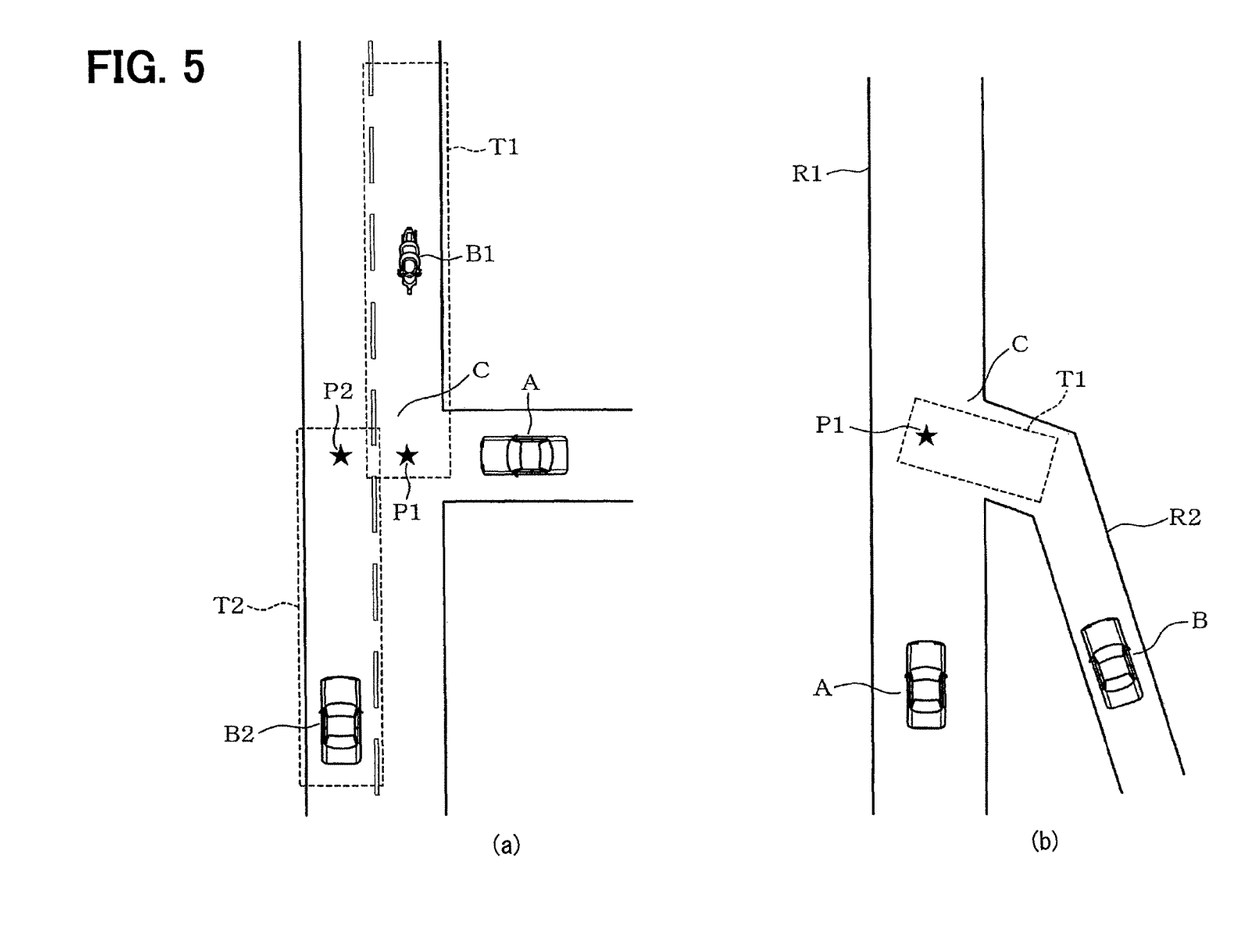
FIG. 5(a) is a diagram illustrating a collision prediction technique in a related technology.
FIG. 5(b) is a diagram illustrating a collision prediction technique in a related technology by using a differently shaped road.

FIG. 5(a) illustrates an example of specifying intersection C where subject vehicle A is predicted to pass, based on vehicle information such as the position or the travel direction of subject vehicle A and based on road map information. This settles: determination target areas T1 and T2 where different vehicles B1 and B2 having possibilities of collision are present; and reference points P1 and P2 where the collision may occur.

Suppose that different vehicles B1 and B2 travel toward reference points P1 and P2 in determination target areas T1 and T2 acquired by the communication. In this case, the collision prediction is determined by calculating the time at which subject vehicle A, and different vehicles B1 and B2 reach reference points P1 and P2. The collision, if predicted to be likely to occur, is audiovisually notified to a driver. Collision estimation information is also transmitted to different vehicles B1 and B2. This invites attention of drivers of subject vehicle A, and different vehicles B1 and B2.

However, the above-mentioned related technology determines the collision prediction based on whether vehicles A, B1, and B2 are traveling toward predetermined reference points P1 and P2. In FIG. 5(b), for example, road R2 is shaped to merge from sideways to main road R1 where subject vehicle A is traveling so that road R2 connects to road R1 at an obtuse angle or along a curve. In this case, immediately before different vehicle B enters intersection C (area T1), it is determined that vehicle B is traveling toward reference point P1.

A drive support system according to the related technology can determine a probability of collision with a different vehicle by using the road map data, but cannot ensure sufficient accuracy concerning reliability of the collision prediction. The drive support system according to the related technology does not consider a road width or a limiting speed in a vehicle speed when calculating a collision timing, and cannot finely determine the collision prediction.

PRIOR ART LITERATURES

Patent Literature

Patent Literature 1: JP 2013-125337 A

SUMMARY OF INVENTION

It is an object of the present disclosure to provide a driving assistance apparatus capable of sufficiently improving determination accuracy when road map data is used to determine a possibility of collision with a different vehicle.

A driving assistance apparatus in an example of the present disclosure performs driving assistance for a subject vehicle by using a position of the subject vehicle detected by a subject-vehicle position detection section and road map data stored in a road map data storage section and comprises: a different vehicle information acquisition portion that acquires travel information about a different vehicle traveling near the subject vehicle; an intersection specification section that specifies an intersection ahead in a travel direction of the subject vehicle on a traveling road traveled by the subject vehicle based on the position of the subject vehicle and the road map data; a road extraction section that, based on the road map data, extracts another junctional road connected, in a vehicle entry allowed manner, to the specific intersection in the traveling road specified by the intersection specification section; a different vehicle detection section that detects, from the travel information about the different vehicle, whether the different vehicle is travelling the junctional road in a direction to enter the specific intersection; a determination section that determines whether there is a possibility of collision between the different vehicle and the subject vehicle when the different vehicle detection section detects the different vehicle traveling in the direction to enter the specific intersection; and a support section that performs a process to avoid the collision when the determination section determines that there is the possibility of the collision.

As above, when the intersection specification section specifies an intersection ahead in a travel direction on a traveling road traveled by a subject vehicle, the road extraction section extracts another junctional road connected to the specific intersection in a vehicle entry allowed manner. The different vehicle detection section then detects, from the travel information about a different vehicle acquired by the different vehicle detection section, whether the different vehicle is traveling the junctional road in a direction to enter the specific intersection, and, the determination section determines whether there is a possibility of collision between the different vehicle and the subject vehicle when it is detected that the different vehicle is traveling in a direction to enter the specific intersection. The support section performs a process to avoid a collision if it is determined that there is the possibility of the collision.

In this case, after the road extraction section extracts the junctional road, the different vehicle detection section detects, from the travel information about the different vehicle, whether the different vehicle is traveling the junctional road toward the specific intersection. The different vehicle targeted at the collision determination is extracted depending on whether different vehicle is traveling the junctional road instead of whether the different vehicle is traveling toward the specific intersection. Accordingly, the timing in determining whether there is a possibility of collision is not limited to immediately before the different vehicle enters the specific intersection. The use of the road map data can prevent incorrect determination at a grade separation or a one-way street. As a result, it is possible to improve reliability in determining a possibility of collision with the different vehicle through the use of the road map data, consequently making it possible to appropriately perform a process to avoid the collision.

BRIEF DESCRIPTION OF DRAWINGS

The foregoing and other objects, features and advantages of the present disclosure will become more apparent from the detailed description o given below with reference to the accompanying drawings in which.

EMBODIMENTS FOR CARRYING OUT INVENTION

Figure 1:
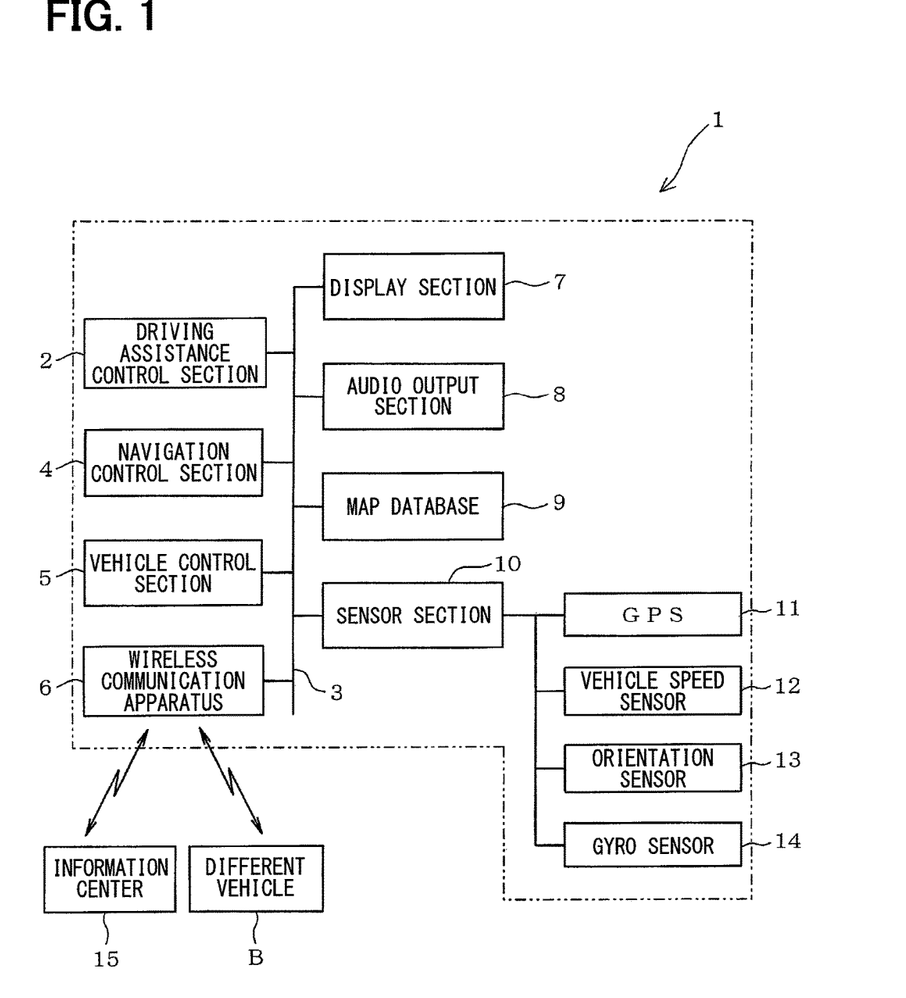
FIG. 1 illustrates an embodiment and is a block diagram schematically illustrating an electric configuration of a driving assistance apparatus.

An embodiment will be described with reference to FIGS. 1 through 3. A driving assistance apparatus 1 according to the present embodiment is mounted on a subject vehicle A1 (see FIG. 3) such as an automobile (4-wheel vehicle). FIG. 1 schematically illustrates an electric configuration of the driving assistance apparatus 1. According to the embodiment, the driving assistance apparatus 1 is configured to include an onboard navigation system (to be capable of cooperation).

As illustrated in FIG. 1, the driving assistance apparatus 1 includes a driving assistance control section 2 having a computer as a main component. The driving assistance control section 2 uses an in-vehicle LAN 3 such as CAN (Car Area Network), for example, to mutually connect with a navigation control section 4, a vehicle control section 5, a wireless communication apparatus 6, a display section 7, an audio output section 8, a map database 9, and a sensor section 10. The sensor section 10 includes a GPS receiver 11, a vehicle speed sensor 12, an orientation sensor 13, and a gyro sensor 14.

The display section 7 is, for example, a liquid crystal display instrument capable of color display, or the like, and is placed at a position such as an instrument panel (or a meter section) a driver can visually recognize. Screens of the display section 7 include a menu screen, various information (messages), and a map screen when a navigation function is used, for example. The audio output section 8 includes a speaker and outputs music or guidance audio.

The navigation control section 4 includes a computer as its main component and performs a navigation process in accordance with a program stored in ROM. At this time, the navigation control section 4 detects a current position (absolute position), traveling direction, speed, mileage, and current time of subject vehicle A based on various sensor signals from the sensor section 10. The navigation control section 4 therefore functions as a position detection section and a position detection means along with the sensor section 10.

The map database 9 stores road map data at any parts of Japan, associated facility data such as various facilities and retail premises, and map matching data. The map database 9 functions as a road map data storage section and a road map data storage means. The road map data is provided as link data by dividing a road on the map into a plurality of parts using intersections as nodes and defining a part between nodes as a link. The link data includes data such as a link ID (identifier) specific to the link, a link length, position data (longitude and latitude) at the beginning and the end (nodes) of the link, angle (direction) data, road width, road type, and limiting speed. The link data further includes data to reproduce (draw) the road map on the screen of the display section 7.

The navigation control section 4 thereby performs a location function and a route guidance function. The location function uses the screen of the display section 7 to display the detected position of subject vehicle A along with the road map. The route guidance function searches for a recommended route to a user-specified destination and provides guidance on the route. A map matching process is performed to place the position of subject vehicle A on a displayed road of the electronic map when the location function is implemented. The map matching process estimates a currently traveled road by performing comparison and matching between a traveled trajectory of subject vehicle A and a road shape in the road map data in consideration of an error. The route search uses the publicly known Dijkstra's algorithm. As publicly known, the route guidance is performed by providing screen display of the display section 7 and allowing the audio output section 8 to output necessary guidance audio.

The vehicle control section 5 is configured to be capable of controlling an accelerator, a brake, a transmission, and a steering system. As will be described later, the vehicle control section 5 can automatically operate, for example, the brake to avoid a collision, based on a manipulation signal from the driving assistance control section 2 without the aid of driver's manipulation.

The wireless communication apparatus 6 performs vehicle-to-vehicle communication with different vehicle B that travels in the vicinity (in a circular area with a predetermined radius (e.g., a radius of 300 m) around the position of subject vehicle A) of subject vehicle A. The vehicle-to-vehicle communication transmits travel information about subject vehicle A to different vehicle B and receives (acquires) travel information about different vehicle B. The travel information includes at least vehicle position information. The travel information may include information about the travel direction and the speed. The wireless communication apparatus 6 therefore functions as a communication section, a communication means, a different vehicle information acquisition portion, and a different vehicle information acquisition means. A travel assistance control section 2 stores the position information about different vehicle B acquired by the vehicle-to-vehicle communication in association with the time information to generate travel trajectory information of different vehicle B with a lapse of time.

The wireless communication apparatus 6 communicates with an information center 15 via an unshown roadside device (such as an ITS spot roadside device or an optical beacon roadside device). In this case, the wireless communication apparatus 6 transmits information (probe information) such as a travel history of subject vehicle A to the information center 15. The wireless communication apparatus 6 also receives road traffic information (such as congestion, accident, construction, lane regulation, and traffic regulation) from the information center 15.

The driving assistance control section 2 provides subject vehicle A with driving support, in this case, collision prediction using the position of subject vehicle A detected by the navigation control section 4 and the road map data stored in the map database 9. As will be explained in the description of an operation (the description of a flowchart), the driving assistance control section 2 specifies intersection (specific intersection) C and extracts another junctional road R2 based on the position of subject vehicle A and the road map data. As illustrated in FIG. 3, specific intersection C is located ahead of subject vehicle A in a traveling direction thereof on traveling road R1 where subject vehicle A is traveling. Junctional road R2 is connected to specific intersection C in a vehicle entry allowed manner.

The driving assistance control section 2 uses travel information (travel trajectory information) about different vehicle B and detects whether different vehicle B is traveling junctional road R2 in a direction to enter specific intersection C. The driving assistance control section 2 determines whether there is a possibility of collision between different vehicle B and subject vehicle A if detecting that different vehicle B is traveling in the direction to enter specific intersection C. The driving assistance control section 2 performs a process to avoid the collision if determining that there is the possibility of collision. The driving assistance control section 2 therefore functions as an intersection specification section, an intersection specification means, a road extraction section, a road extraction means, a different vehicle detection section, a different vehicle detection means, a determination section, a determination means, a support section, and a support means.

More specifically, for detecting whether different vehicle B is traveling junctional road R2 in the direction to enter specific intersection C, the driving assistance control section 2 generates travel trajectory information from travel information (position information at each predetermined time) about different vehicle B acquired from the vehicle-to-vehicle communication. The driving assistance control section 2 performs map matching with road shape data about junctional road R2 to determine (detect) whether different vehicle B is traveling junctional road R2. Furthermore, for detecting different vehicle B, the driving assistance control section 2 performs a screening process on different vehicle B located near junctional road R2 in such manner that the screening process configures a polygon corresponding to the road width to determine whether the different vehicle B is inside or the outside the polygon. Only for different vehicle B determined as inside the polygon, the driving assistance control section 2 determines whether the different vehicle B is traveling junctional road R2

For determining whether there is the possibility of collision, the driving assistance control section 2 calculates time point at which subject vehicle A and different vehicle B will reach reference position P, based on distances to reference position P settled at specific intersection C and vehicle speeds. The calculation considers the information about the width of junctional road R2 or the limiting speed to settle the speed of different vehicle B.

When determining that there is the possibility of collision, the driving assistance control section 2 performs a support process to avoid the collision. The support process includes: giving attention with a display on the display section 7; warning with a display on the display section 7 and an audio output from the audio output section 8; and giving a forced stop by forcibly braking subject vehicle A by the vehicle control section 5. In the support process, the attention, the warning, and the forced stop are performed in this order with decreasing distance between subject vehicle A and specific intersection C (reference position P). In the embodiment, the support process to avoid the collision further issues a notification to different vehicle B that is likely to collide, by the vehicle-to-vehicle communication.

The description below explains the operation of the above-mentioned configuration with reference to FIGS. 2 and 3. A flowchart in FIG. 2 schematically illustrates a procedure of driving assistance (collision prediction) performed by the driving assistance control section 2. As above, FIG. 3 schematically illustrates a road shape of specific intersection C targeted at the collision prediction. The example shown in FIG. 3 is such that subject vehicle A is traveling the traveling road R1 in a predetermined direction (the direction of arrow F), specific intersection C exists ahead of subject vehicle A and is connected to junctional road R2 so as to merge, and different vehicle B is traveling junctional road R2.

Figure 2:
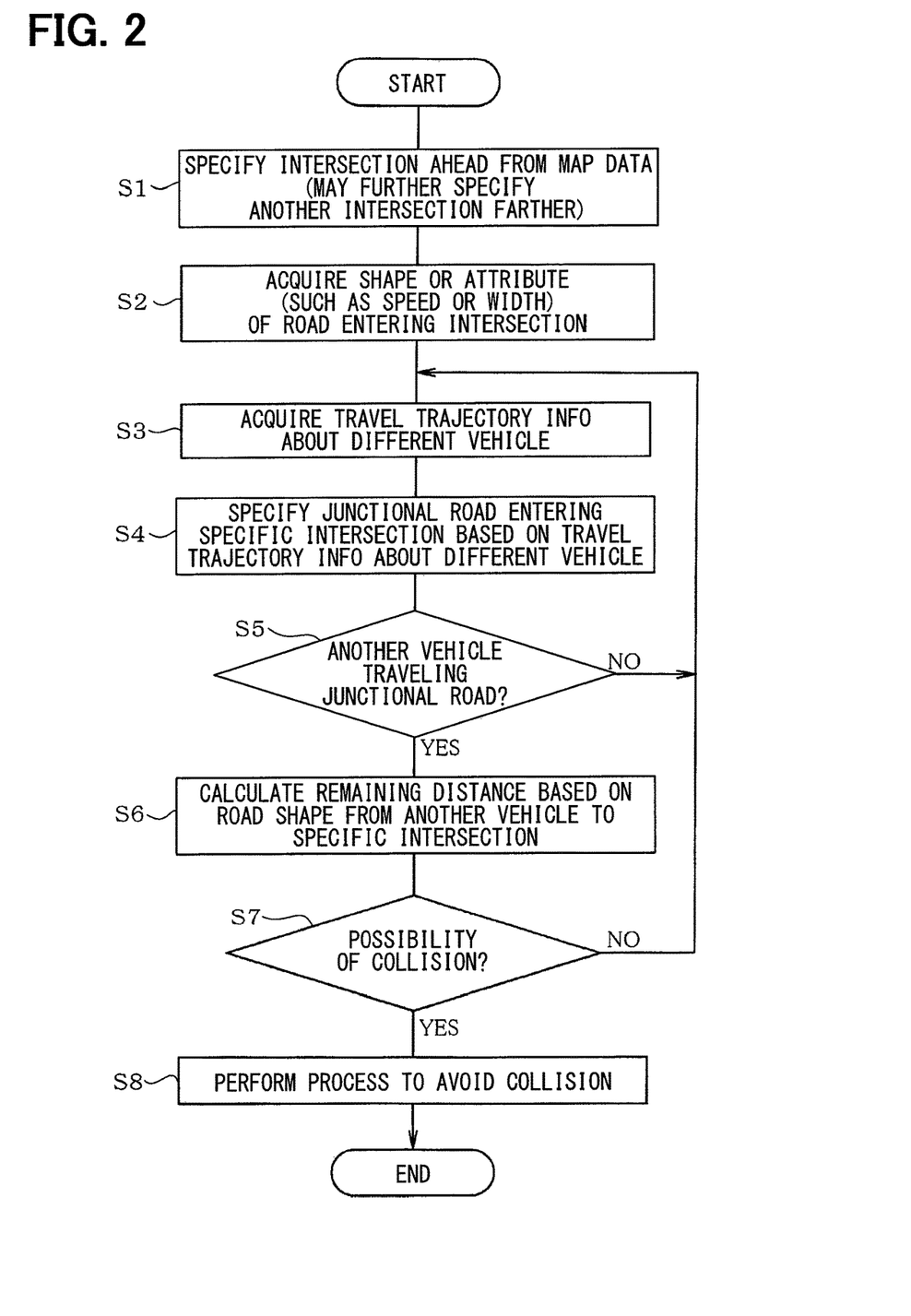
FIG. 2 is flowchart illustrating a procedure of a collision prediction process performed by a driving assistance section.
Figure 3:
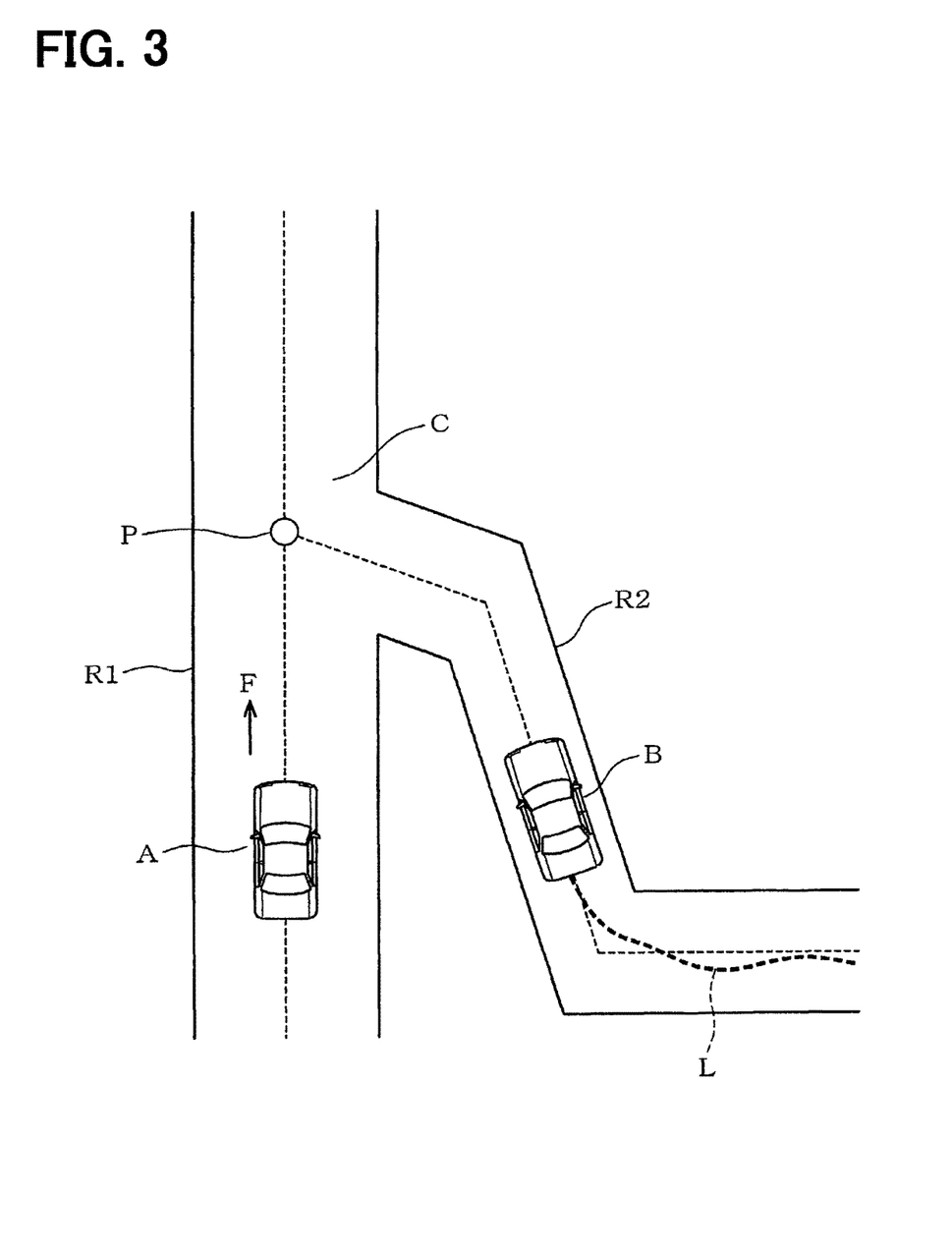
FIG. 3 is a diagram exemplarily illustrating a road shaped of a specific intersection part.

At step S1 of the flowchart in FIG. 2, the process specifies intersection C ahead of subject vehicle A on traveling road R1 (within a predetermined distance (e.g., 300 m) from subject vehicle A) based on the current position of subject vehicle A and the road map data. The process may successively specify a plurality of intersections C within the predetermined distance ahead. At step S2, the process extracts junctional road R2 from the road map data. Junctional road R2, which is not traveling road R1, is connected to specified specific intersection C in a vehicle entry allowed manner. The process further acquires data related to an attribute (such as the limiting speed or the road width) of junctional road R2.

At step S3, the process generates travel trajectory information L about each vehicle B from the travel information about different vehicle B traveling around. The travel information is acquired from the vehicle-to-vehicle communication. There may be a plurality of different vehicles B around subject vehicle A (within a circle with a radius of 300 m). In such a case, the process performs a screening process to select different vehicles B near junctional road R2 and then performs the process on selected different vehicles B in ascending order from the one nearest to specific intersection C (reference position P).

At step S4, the process determines (detects) whether different vehicle B is traveling junctional road R2, based on the travel trajectory information about different vehicle B. As above, the process determines (detects) whether different vehicle B is traveling junctional road R2, by performing map matching between travel trajectory information L (see FIG. 3) about different vehicle B and road shape data (represented by a thin dotted line in FIG. 3) about junctional road R2. At step S5, the process determines whether there is different vehicle B traveling junctional road R2. The process is repeated from step S3 if there is no different vehicle B traveling junctional road R2 (No at step S5).

The process proceeds to step S6 if there is different vehicle B traveling junctional road R2 (Yes at step S5). At step S6, from the current position of different vehicle B and the road map data, the process calculates a remaining distance for different vehicle B up to reference position P settled at specific intersection C. At step S7, the process determines whether there is the possibility of collision between different vehicle B and subject vehicle A at specific intersection C.

For determining whether there is the possibility of collision, the process calculates the time of arrival of different vehicle B at reference position P, based on the remaining distance to reference position P and the speed of different vehicle B. The process compares the time of arrival of different vehicle B at reference position P with the estimated time of arrival of subject vehicle A at reference position P and determines whether a difference between the arrival times satisfies a threshold value. The calculation may use an actual speed of different vehicle B or may estimate the speed thereof in consideration of the limiting speed or the width of junctional road R2. The process returns to step S3 if determining that there is no possibility of collision (No at step S7). Though not shown in the drawing, the process is repeated from steps S3 to S7 until different vehicle B as a target is unavailable.

The process proceeds to step S8 if determining that there is a possibility of collision (Yes at step S7), and then performs a process to avoid the collision. As a process in this case, the display section 7 provides a display for attention if a distance from subject vehicle A to specific intersection C (reference position P) is larger than 100 m, for example. The display section 7 provides a display and the audio output section 8 outputs audio for warning if the distance is larger than 30 m and is shorter than or equal to 100 m. The vehicle control section 5 forcibly brakes subject vehicle A for forced stop if the distance is 30 m or shorter. In the embodiment, the support process to avoid the collision further uses the vehicle-to-vehicle communication to issue a notification to different vehicle B that is likely to collide.

The driving assistance apparatus 1 according to the embodiment is configured to perform the collision prediction by extracting junctional road R2 connected to specific intersection C and detecting whether different vehicle B is traveling junctional road R2 toward specific intersection C, based on the travel information about different vehicle B. Different vehicle B targeted at the collision determination is extracted depending on whether different vehicle B is traveling junctional road R2 instead of whether different vehicle B is traveling toward the specific intersection, and accordingly, the timing in determining a possibility of collision is not limited to immediately before different vehicle B enters specific intersection C. Additionally, the use of the road map data can prevent incorrect determination at a grade separation or a one-way street.

As a result, the embodiment can advantageously improve reliability in determining a possibility of collision with different vehicle B through the use of road map data, consequently making it possible to appropriately perform a process to avoid the collision.

In particular, the present embodiment is configured to acquire the travel information about different vehicle B in the vicinity by allowing the wireless communication apparatus 6 to perform vehicle-to-vehicle communication with different vehicle B and acquiring at least the position information as the travel information. The embodiment is therefore applicable to even different vehicle B not including comparable map data (or using incompatible map) and becomes not dependent of systems owned by other companies, and is therefore applicable widely. Additionally, because a processing load on different vehicle B can be decreased and the information center 15 need not centralize the travel information about vehicles, the communication can be efficient. The information about travel trajectory L is generated from the acquired position information about different vehicle B and is map-matched with road shape data, making it possible to accurately determine whether different vehicle B is traveling junctional road R2.

The embodiment detects different vehicle B traveling junctional road R2 by performing the screening process on different vehicle B located near junctional road R2 so that the screening process configures a polygon to determine the inside or the outside. The embodiment determines whether different vehicle B determined to be located inside the polygon is traveling junctional road R2. The embodiment can previously select different vehicle B targeted at the collision prediction and decrease a processing load even when there is a plurality of different vehicles B around.

Moreover, the embodiment determines a possibility of collision between subject vehicle A and different vehicle B by calculating a time point when subject vehicle A and different vehicle B reach reference position P, based on distance sto reference position P settled at specific intersection C and based on vehicle speeds. The embodiment can sufficiently reliably determine a possibility of collision based on the distances to reference position P and the vehicle speeds. The calculation settles a speed of different vehicle B in consideration of information such as the width of junctional road R2 or the limiting speed. The embodiment can further improve accuracy in calculating a time point to reach reference position P.

The embodiment performs the support process corresponding to a distance between subject vehicle A and specific intersection C (reference position P) out of a plurality of types of support processes (such as attention, warning, and forced stop) in case of a possibility of collision. The embodiment can perform the process corresponding to an urgent need and can efficiently perform the effective process. The process to avoid collision also includes a notification to different vehicle B that is likely to collide. The embodiment can provide warning against the collision and further improve the safety for different vehicle B (including a two-wheel vehicle) that does not include a driving assistance apparatus comparable to that of subject vehicle A.

Figure 4:
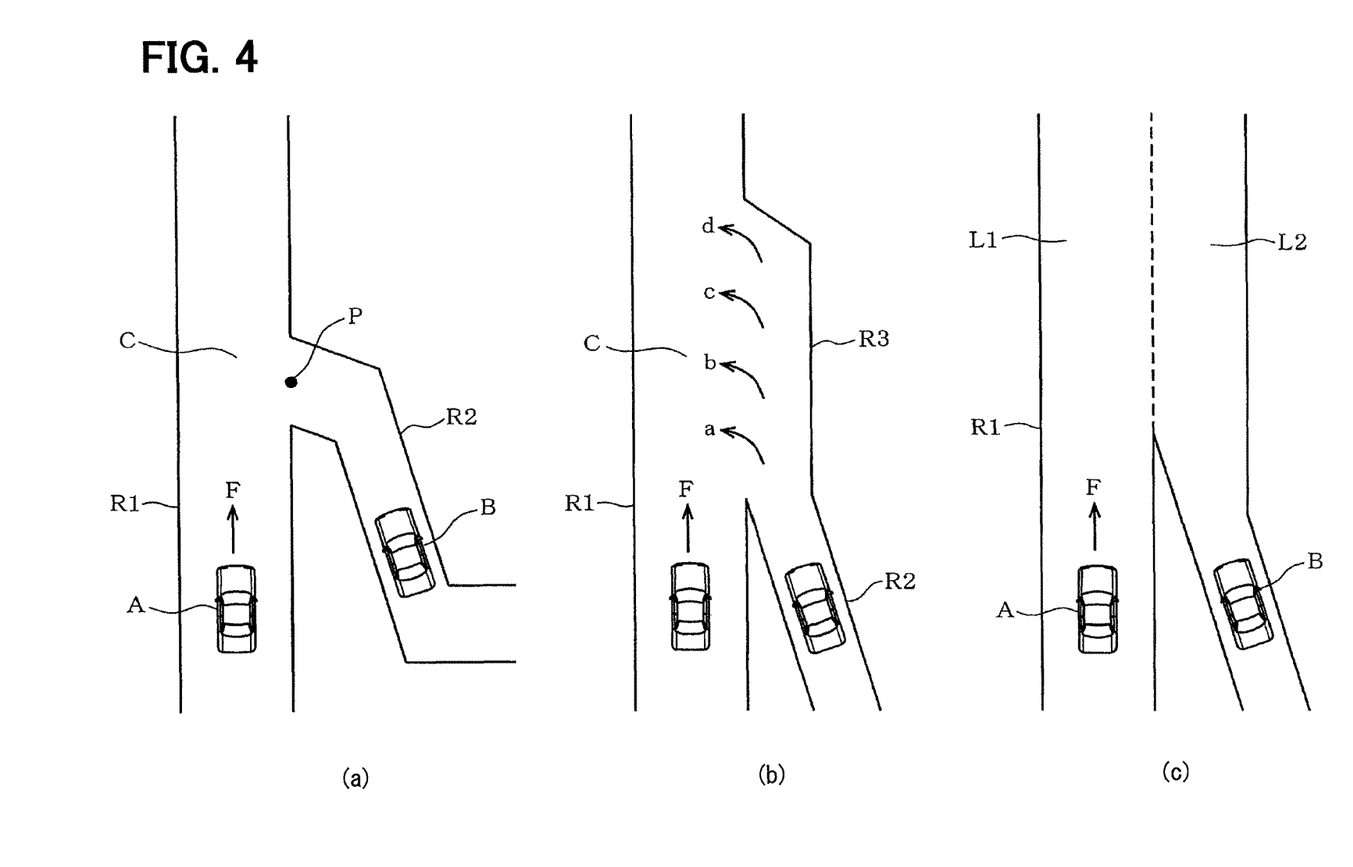
FIG. 4(a) is a diagram illustrating an example of settling a reference position at an entry to a specific intersection viewed from a different vehicle.
FIG. 4(b) is a diagram illustrating an example of settling reference position P at a trajectory part that includes the largest number of vehicles actually traveling.
FIG. 4(c) is a diagram illustrating an example of collision determination that considers lane information.

The above-mentioned embodiment settles reference position P near the center of specific intersection C. However, reference position P can be settled in consideration of a road connection form at specific intersection C. As illustrated in FIG. 4(*a*), for example, reference position P may be settled at the entry into specific intersection C viewed from different vehicle B.

FIG. 4(*b*) illustrates that relatively long merging road R3 is provided at intersection C where traveling road R1 and junctional road R2 connect with each other. Different vehicle B may follow various travel trajectories as indicated by arrows a through d in the drawing for merging. In such a case, probe information can be acquired from the information center 15 to settle reference position P corresponding to the trajectory (e.g., arrow c) where vehicles actually travel most frequently. This can settle reference position P at the position where an actual collision likely to occur. The determination accuracy can be further improved.

Though not described in the above-mentioned embodiment, a possibility of collision can be determined in consideration of lane information about a road traveled by vehicle A and different vehicle B. In this case, when a plurality of lanes exist after the position where traveling road R1 merges as illustrated in FIG. 4(c), there is no possibility of collision if lane L1 traveled by subject vehicle A differs from lane L2 traveled by different vehicle B. The presence or absence of a possibility of collision largely depends on a lane traveled by subject vehicle A or different vehicle B if a plurality of lanes exist on traveling road R1. Consideration of the lane information can further improve the accuracy in determining a possibility of collision.

In addition, various modifications may be applied to a hardware configuration or a software configuration of the driving assistance apparatus or a car navigation system (an overall vehicle system). The communication center 15 may centralize travel information about different vehicle B and road-to-vehicle communication may acquire the travel information instead of acquiring information about different vehicle B by using the vehicle-to-vehicle communication. The technical idea of the present disclosure is not limited to the embodiment illustrated above and illustrated in the drawings, but may be embodied in various modifications without departing from the spirit and scope of the disclosure.

While there have been described specific embodiments and configurations of the present disclosure, the disclosure is not limited to the above-mentioned embodiments and configurations. The scope of embodiments and configurations of the disclosure also includes an embodiment and a configuration resulting from appropriately combining technical portions disclosed in different embodiments and configurations.

The invention claimed is:

1. A driving assistance apparatus that performs driving assistance for a subject vehicle by using a position of the subject vehicle detected by a subject-vehicle position detection section and road map data stored in a road map data storage section, the driving assistance apparatus comprising:
a different vehicle information acquisition portion that acquires travel information about a different vehicle traveling near the subject vehicle;
an intersection specification section that specifies a specific intersection ahead in a travel direction of the subject vehicle on a traveling road traveled by the subject vehicle based on the position of the subject vehicle and the road map data;
a road extraction section that, based on the road map data, extracts a junctional road connected, in a vehicle entry allowed manner, to the specific intersection in the traveling road specified by the intersection specification section;
a different vehicle detection section that detects, from the travel information about the different vehicle, whether the different vehicle is travelling the junctional road in a direction to enter the specific intersection;
a determination section that determines whether there is a possibility of collision between the different vehicle and the subject vehicle when the different vehicle detection section detects the different vehicle traveling in the direction to enter the specific intersection; and
a support section that performs a process to avoid the collision when the determination section determines that there is the possibility of the collision;
wherein the different vehicle detection section performs a screening process on the different vehicle located near the junctional road, the screening process including performing an inside-outside determination by configuring a polygon corresponding to a road width of the junctional road, determining whether the different vehicle is located inside of the polygon, and determining whether the different vehicle is traveling the junctional road in response to determining that the different vehicle is located inside of the polygon.

2. The driving assistance apparatus according to claim 1, wherein:
the different vehicle information acquisition portion includes a communication section to perform vehicle-to-vehicle communication with the different vehicle nearby and acquires at least position information as the travel information about the different vehicle.

3. The driving assistance apparatus according to claim 1, wherein the determination section determines whether there is the possibility of the collision by calculating time points at which the subject vehicle and the different vehicle will reach a reference position, based on distances to the reference position settled at the specific intersection and vehicle speeds.

4. The driving assistance apparatus according to claim 3, wherein
the determination section settles a speed of the different vehicle in consideration of information about one of the road width and limiting speed of the junctional road.

5. The driving assistance apparatus according to claim 3, wherein
the determination section settles the reference position in consideration of a connection form of a road at the specific intersection.

6. The driving assistance apparatus according to claim 1, wherein
the determination section determines whether there is the possibility of collision by considering lane information about roads traveled by the subject vehicle and the different vehicle.

7. The driving assistance apparatus according to claim 1, wherein
the support section performs, of a plurality of types of support processes, a support process corresponding to a distance from the subject vehicle to the specific intersection.

8. The driving assistance apparatus according to claim 1, wherein
the process performed by the support section to avoid the collision includes a notification to the different vehicle that is likely to collide.

* * * * *